(12) United States Patent
Huang (10) Patent No.: US 9,776,651 B2
(45) Date of Patent: Oct. 3, 2017

(54) CART

(71) Applicant: Chung-Yi Huang, Taichung (TW)

(72) Inventor: Chung-Yi Huang, Taichung (TW)

( * ) Notice: Subject to any disclaimer, the term of this patent is extended or adjusted under 35 U.S.C. 154(b) by 0 days.

(21) Appl. No.: 15/165,880

(22) Filed: May 26, 2016

(65) Prior Publication Data

US 2017/0001655 A1    Jan. 5, 2017

(30) Foreign Application Priority Data

Jun. 30, 2015    (TW) .............................. 104210536 U (51) Int. Cl.
*B62B 3/02* (2006.01)
*B62B 3/00* (2006.01)

(52) U.S. Cl.
CPC .............. *B62B 3/005* (2013.01); *B62B 3/003* (2013.01)

(58) Field of Classification Search
CPC ... A47B 7/0025; A47B 7/0041; A47B 7/0058; B62B 3/005; B62B 1/12
USPC .............. 280/47.19, 47.35; 211/206, 126.15; 312/265.2, 263, 264
See application file for complete search history.

(56) References Cited

U.S. PATENT DOCUMENTS

| | | | | |
|---|---|---|---|---|
| 3,856,374 A * | 12/1974 | Christen | ................ | A23B 4/052 219/392 |
| 5,207,723 A * | 5/1993 | Newby, Sr. | ............... | B62B 1/12 280/47.19 |
| 5,294,196 A * | 3/1994 | Chen | ........................ | B25H 1/12 312/218 |
| 6,050,660 A * | 4/2000 | Gurley | ..................... | B25H 5/00 280/47.26 |
| 6,079,719 A * | 6/2000 | Tisbo | ................... | A47B 88/044 280/47.19 |
| 6,086,073 A * | 7/2000 | Tisbo | ....................... | B25H 1/02 280/47.26 |
| 6,123,344 A * | 9/2000 | Clegg | ....................... | B62B 1/14 211/194 |
| 6,688,615 B2 * | 2/2004 | Chen | .................. | A47G 23/0225 280/47.35 |
| 6,761,364 B2 * | 7/2004 | Murar | ....................... | B62B 3/14 280/33.991 |
| 6,843,488 B1 * | 1/2005 | Tseng | ....................... | F16B 12/26 280/47.35 |
| 7,014,200 B2 * | 3/2006 | Calmeise | ................ | B62B 3/006 280/47.19 |
| 7,213,817 B2 * | 5/2007 | Cheung | ................... | B62B 3/025 280/42 |

(Continued)

*Primary Examiner* — Jeffrey J Restifo
(74) *Attorney, Agent, or Firm* — Alan D. Kamrath; Kamrath IP Lawfirm, P.A.

(57) ABSTRACT

A cart includes a first side board and a second side board. Each of the first and second side boards has first holes and second holes respectively defined in the upper and lower portions thereof. A first rod unit and a second rod unit are respectively connected to the first holes and the second holes of the first and second side boards. At least two shelves are movably mounted on the first and second rod units between the first and second side boards. A first wheel unit and a second wheel unit are respectively connected to the second holes at the front side and the rear side of the body so as to assemble the cart. The diameter of the second wheel unit is larger than that of the first wheel unit. The cart is light and suitable to move on an uneven surface.

3 Claims, 11 Drawing Sheets

(56) References Cited

U.S. PATENT DOCUMENTS

| | | | | |
|---|---|---|---|---|
| 7,398,978 B2* | 7/2008 | Cheung | ............... | B62B 3/025 |
| | | | | 280/42 |
| 7,789,403 B2* | 9/2010 | Wilsher | ............ | A47B 67/005 |
| | | | | 280/651 |
| 7,922,014 B2* | 4/2011 | Hassell | ............ | A47F 1/12 |
| | | | | 211/126.15 |
| 8,132,819 B2* | 3/2012 | Landau | ............ | B25H 3/027 |
| | | | | 280/47.131 |
| 8,360,446 B1* | 1/2013 | Hertan | ............ | A47B 81/005 |
| | | | | 280/47.35 |
| 8,567,796 B2* | 10/2013 | Bar-Erez | ............ | B25H 3/023 |
| | | | | 280/47.18 |
| 9,132,543 B2* | 9/2015 | Bar-Erez | ............ | B25H 3/023 |
| 2003/0155729 A1* | 8/2003 | Chen | ............ | A47G 23/0225 |
| | | | | 280/47.35 |
| 2004/0089625 A1* | 5/2004 | Tsai | ............ | A47B 88/0455 |
| | | | | 211/126.2 |
| 2009/0295110 A1* | 12/2009 | Wilsher | ............ | A47B 67/005 |
| | | | | 280/47.35 |
| 2012/0061930 A1* | 3/2012 | Lin | ............ | B25H 3/02 |
| | | | | 280/47.35 |
| 2014/0300260 A1* | 10/2014 | Sofy | ............ | B62B 3/005 |
| | | | | 312/249.11 |
| 2016/0046309 A1* | 2/2016 | Bar-Erez | ............ | B25H 3/023 |
| | | | | 280/47.18 |
| 2016/0332651 A1* | 11/2016 | Benning | ............ | B62B 3/005 |

* cited by examiner

CART

BACKGROUND OF THE INVENTION

1. Fields of the Invention

The present invention relates to a cart, and more particularly, to a cart with multiple shelves for carrying tools from one place to another.

2. Descriptions of Related Art

The conventional cart generally comprises a left wall, a right wall and a rear wall which is connected between the left and right walls. Usually, the left wall, the right wall and the rear wall are metal boards which are connected or welded to each other. Four wheels are connected to four corners of the underside of the cart. Multiple shelves are connected within the cart for receiving tools and parts.

However, the metal boards are heavy and the welding processes for connecting the left wall, the right wall and the rear wall increase the manufacturing cost. The heavy cart is not convenient to move for some users. Furthermore, the four wheels are small in diameter and suitable for movement on a flat surface. When using the cart on an uneven surface, such as the surface has a stepped area, the smaller wheels may not easily move over the stepped area.

The present invention intends to provide a cart which is light in weight and easily move on an uneven surface such that the shortcomings mentioned above are eliminated.

SUMMARY OF THE INVENTION

The present invention relates to a cart and comprises at least two side boards comprising a first side board and a second side board. The first and second side boards are elongate boards and made by way of plastic blow molding. Each of the first and second side boards has first holes defined in the upper portion thereof, and second holes in the lower portion thereof. At least two transverse rod units comprise a first rod unit and a second rod unit, wherein the two ends of the first rod unit extend through the first holes of the first and second side boards, and the two ends of the second rod unit extend through the second holes of the first and second side boards so as to assemble a body. At least two shelves are movably mounted on the first and second rod units between the first and second side boards. At least two wheel units comprise a first wheel unit and a second wheel unit, wherein the first wheel unit is connected to the second holes located at the front side of the body, and the second wheel unit is connected to the second holes located at the rear side of the body so as to assemble the cart.

Preferably, the first wheel unit comprises two brake wheels, and the second wheel unit comprises two climbing wheels. The diameter of each of the climbing wheels is larger than that of each of the brake wheels.

The primary object of the present invention is to provide a cart which is light in weight.

Another object of the present invention is to provide a cart which is suitable for being moved on an uneven surface.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 13, the cart 1 of the present invention comprises at least two side boards comprising a first side board 10 and a second side board 20, wherein the first and second side boards 10, 20 are elongate boards and made by way of plastic blow molding. Each of the first and second side boards 10, 20 has first holes B defined in the upper portion thereof, and second holes C in the lower portion thereof. Each of the first and second side boards 10, 20 has third holes D which are located between the first and second holes B, C.

Multiple transverse rod units comprise a first rod unit, a second rod unit and a third rod unit, wherein two ends of the first rod unit extend through the first holes B of the first and second side boards 10, 20, two ends of the second rod unit extend through the second holes C of the first and second side boards 10, 20, and two ends of the third rod unit extend through the third holes D of the first and second side boards 10, 20 so as to assemble a body 2. The connection between the rod units and the holes can be a force-fitted way or by using locking members "A". The first, second and third rod units each have two rods, wherein the third rod unit has two rods 41, 42, the second rod unit has two straight rods 51, and the first rod unit has a rod 31 and a cylindrical rod 32. Each of the two rods 41, 42 has an end plate extending from each of two ends thereof so as to be connected to the first and second side boards 10, 20. The rod 31 is located at the front side of the body 2 and the cylindrical rod 32 is located at the rear side of the body 2. The rod 31 has an end plate extending from each of two ends thereof so as to be connected to the first and second side boards 10, 20. The cylindrical rod 32 can be used as a handle. The number of the first, second and third holes B, C, and D are two.

Multiple shelves 60 are movably mounted on the first, second and third rod units between the first and second side boards 10, 20. Each of the shelves 60 includes a top plate 61, a bottom plate 62 and a connection plate 63 which is perpendicularly connected to one side of each of the top and bottom plates 61, 62. The connection plate 63 of each of the shelves 60 has at least two separated apertures 631, 632.

Figure 1:
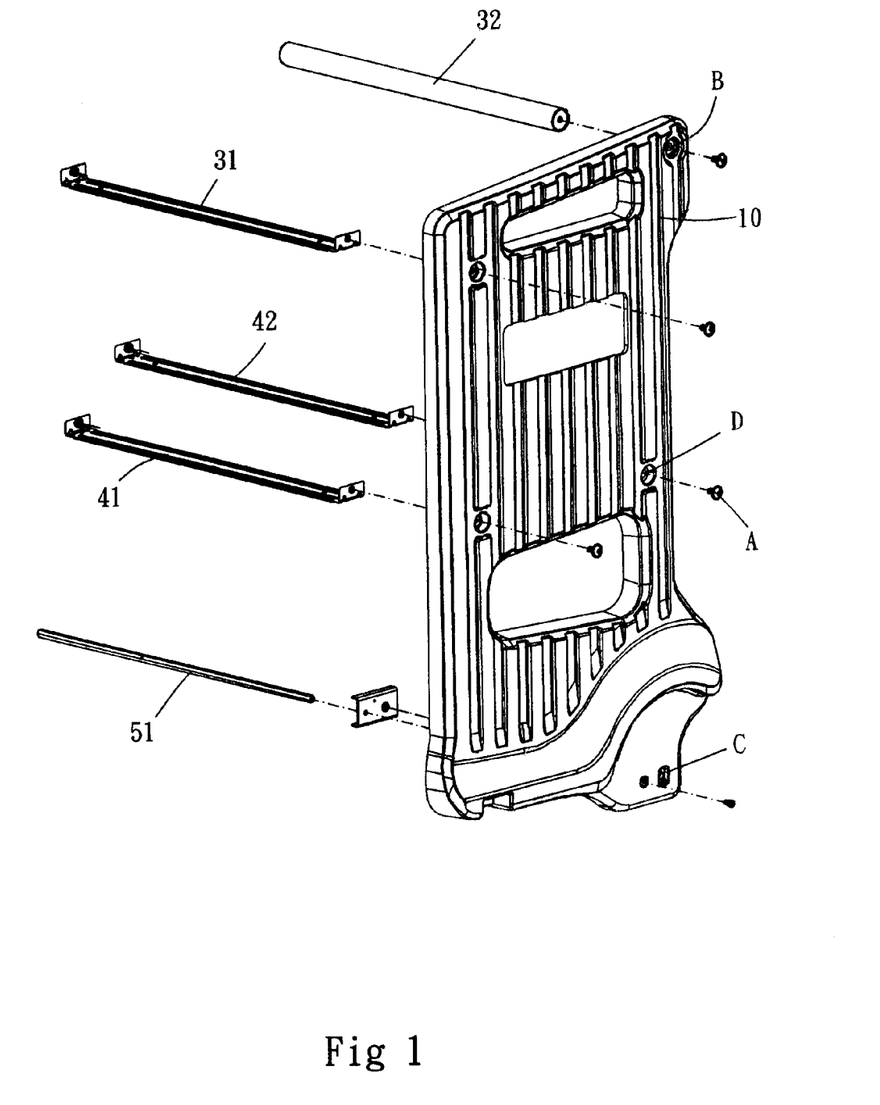
FIG. 1 is an exploded view to show one of the side boards and the transverse rod units of the cart of the present invention.
Figure 2:
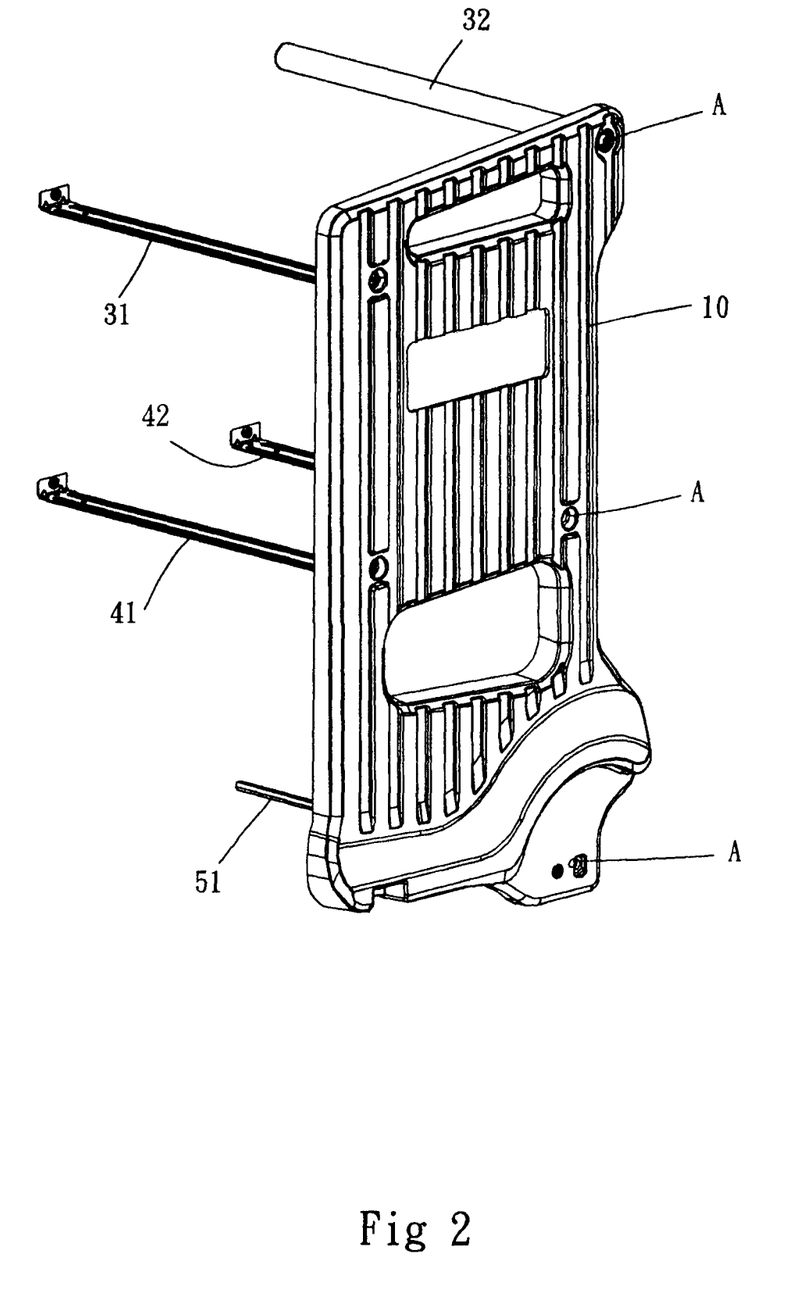
FIG. 2 is a perspective view to show that the transverse rod units are connected to the side board of the cart of the present invention.
Figure 3:
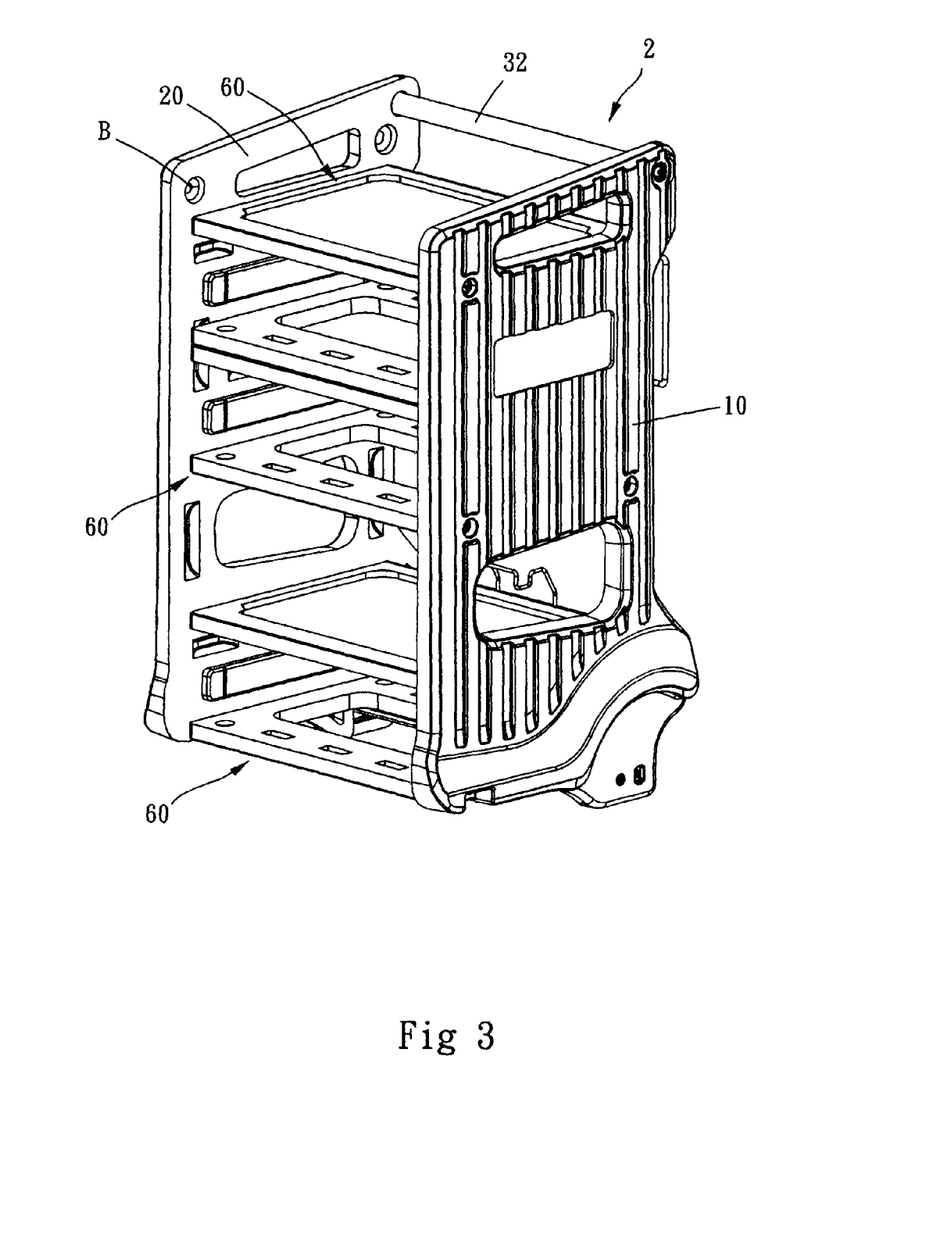
FIG. 3 is a perspective view to show the body of the cart of the present invention.
Figure 4:
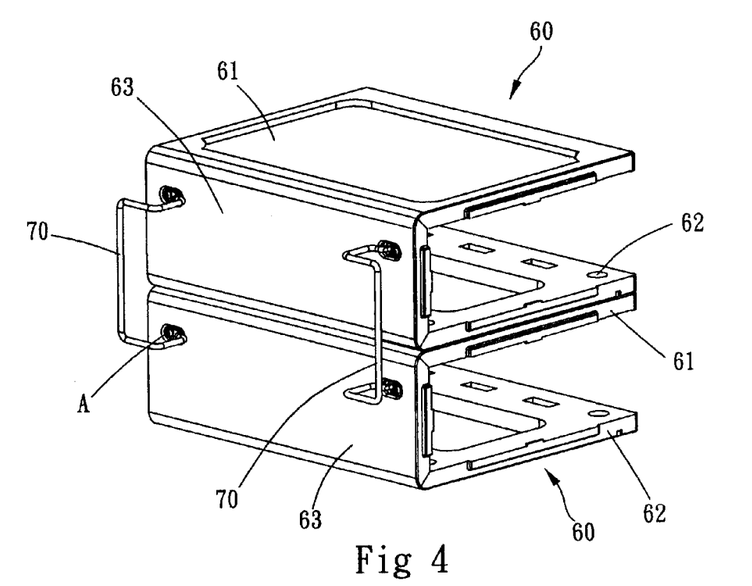
FIG. 4 shows that the connectors are connected between the two adjacent connection plates of the two adjacent shelves of the cart of the present invention.
Figure 5:
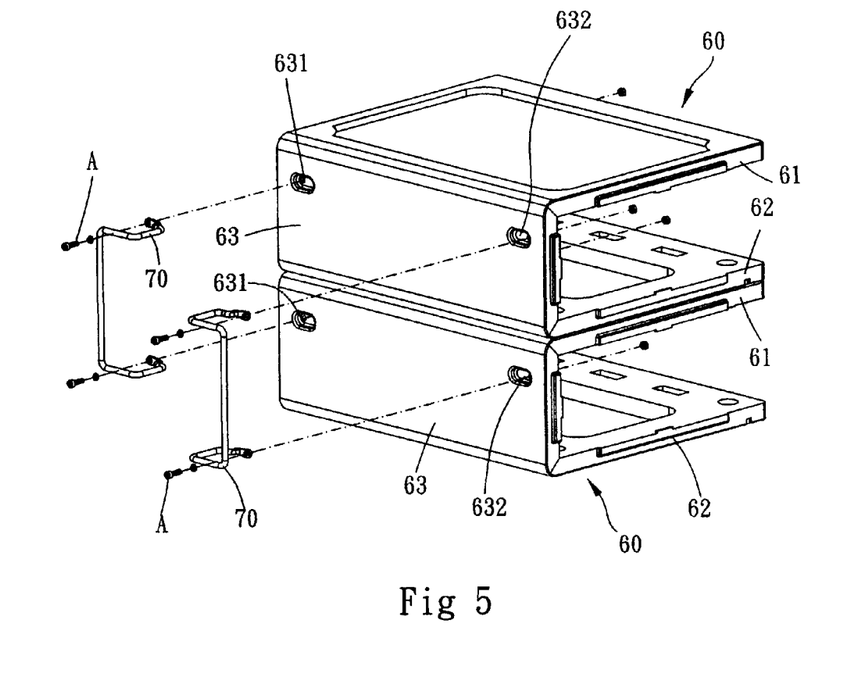
FIG. 5 is an exploded view to show the connectors and the two adjacent shelves of the cart of the present invention.

At least two connectors 70 are connected to the at least two apertures 631, 632 of two adjacent connection plates 63 so as to connect two adjacent shelves 60 to each other as shown in FIGS. 4 and 5.

Figure 6:
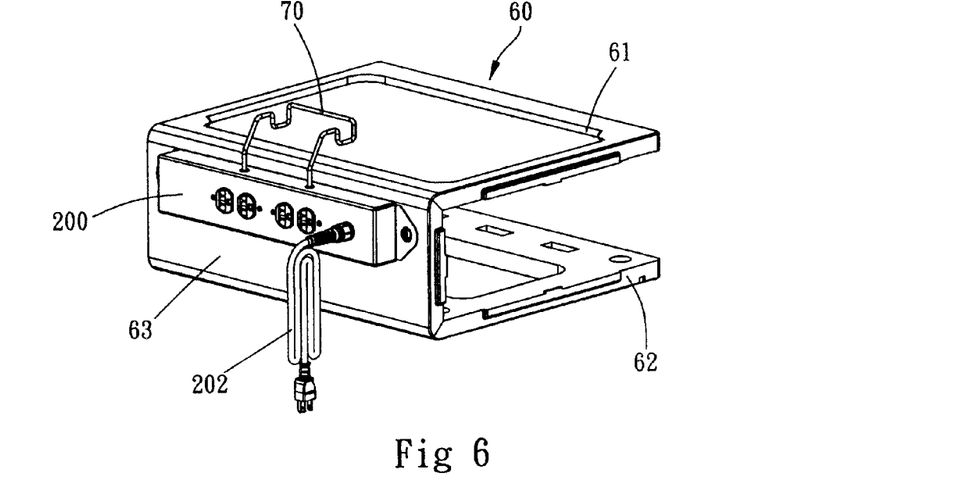
FIG. 6 shows a receptacle unit and a connector connected to the shelf of the cart of the present invention.
Figure 7:
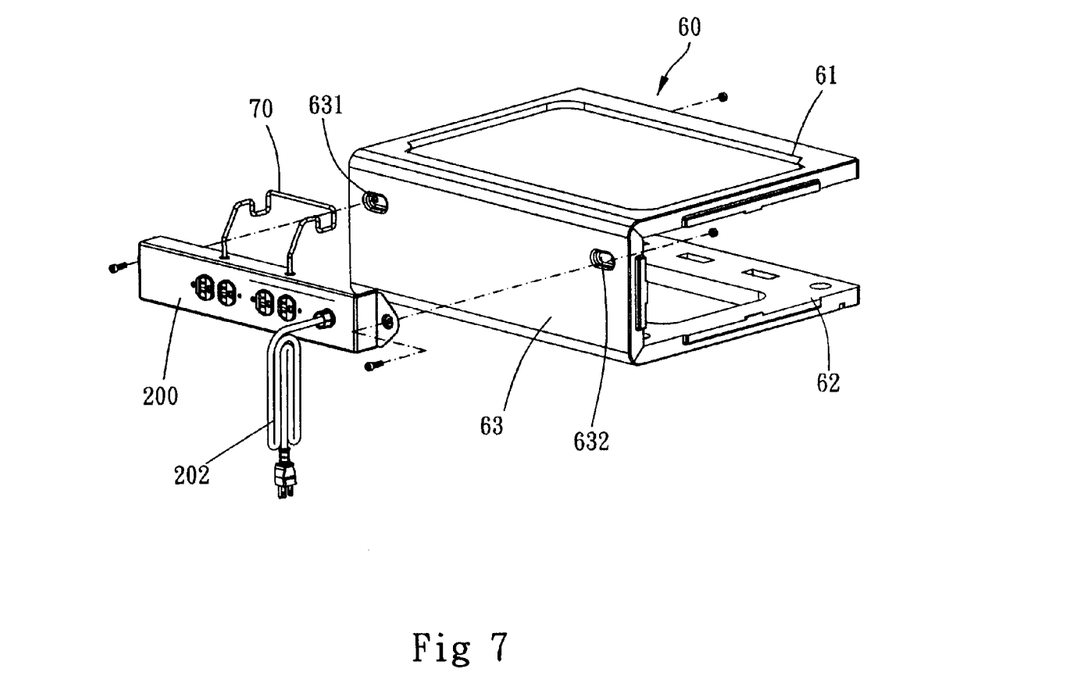
FIG. 7 is an exploded view to show a receptacle unit, a connector and the shelf of the cart of the present invention.

As shown in FIGS. 6 and 7, the shelf 60 can be used individually, and a receptacle unit 200 is connected to the apertures 631, 632. A connector 70 is connected to the top of the receptacle unit 200 so that the cables 202 can be wrapped to the connector 70 when not in use.

At least two wheel units comprise a first wheel unit and a second wheel unit, wherein the first wheel unit is connected to the second holes C located at the front side of the body 2, and the second wheel unit is connected to the second holes C located at the rear side of the body 2 so as to assemble the cart 1. The second wheel unit is connected to the second rod unit by locking members "A". The first wheel unit comprises two brake wheels 81, and the second wheel unit comprises two climbing wheels 91. The diameter of each of the climbing wheels 91 is larger than that of each of the brake wheels 81.

Figure 8:
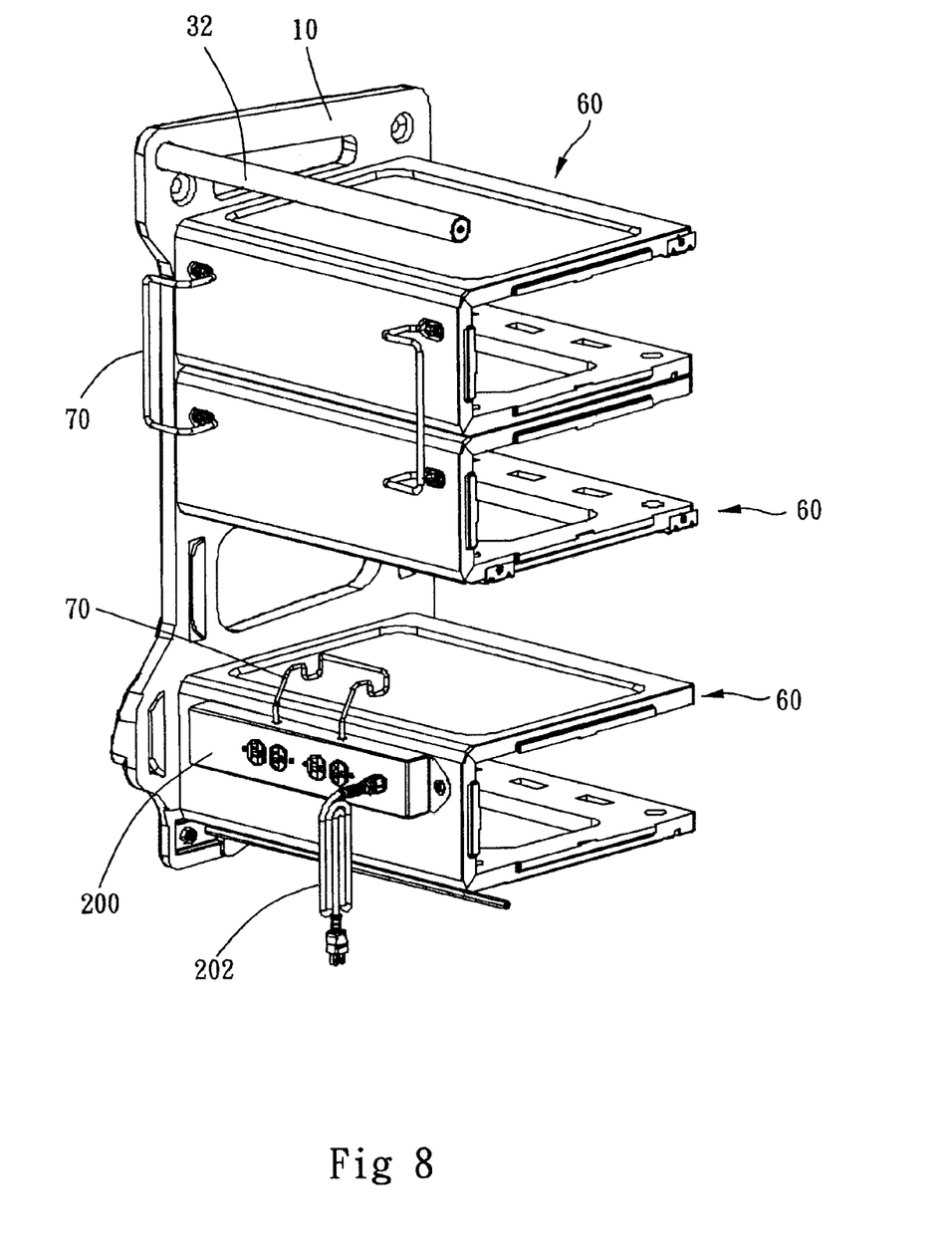
FIG. 8 shows one of the combination of the shelves, the side board, the connectors and receptacle unit.
Figure 9:
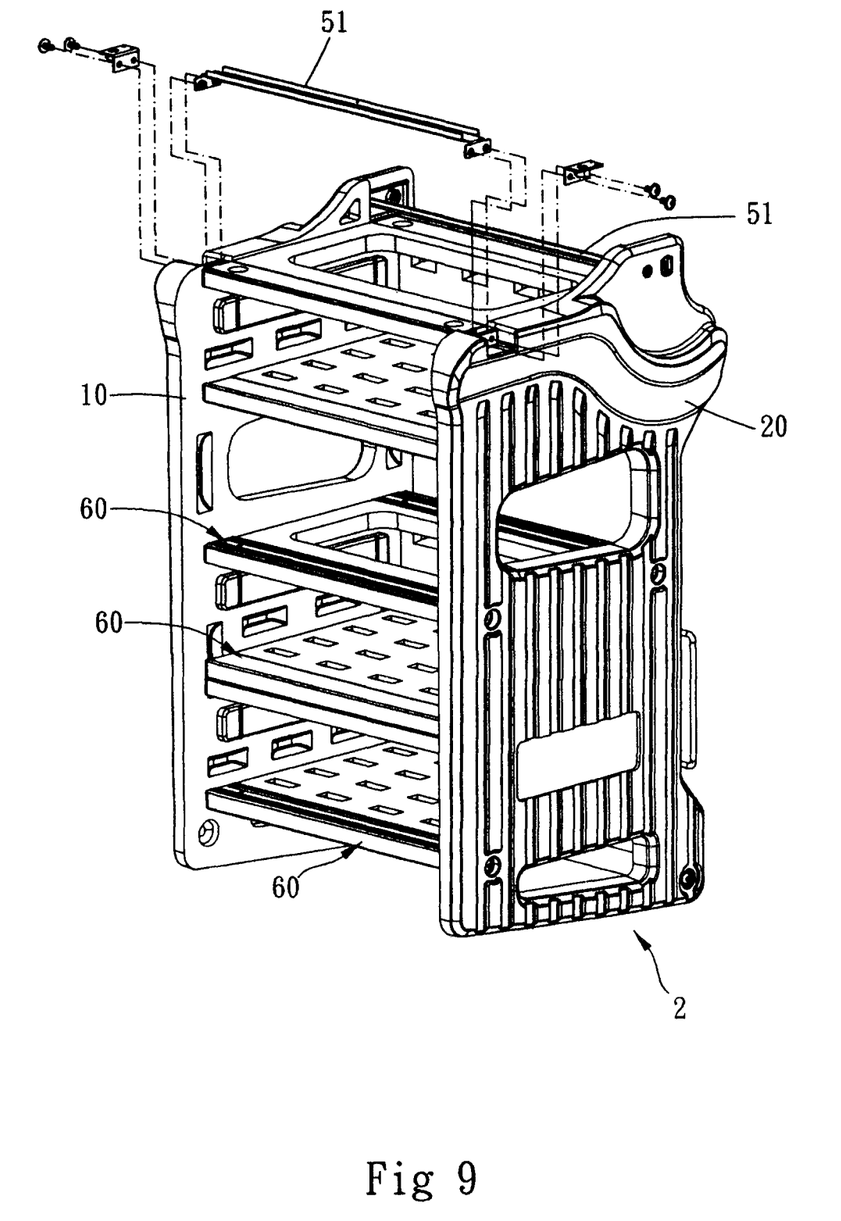
FIG. 9 shows a straight rod is to be connected to the body of the cart of the present invention.
Figure 10:
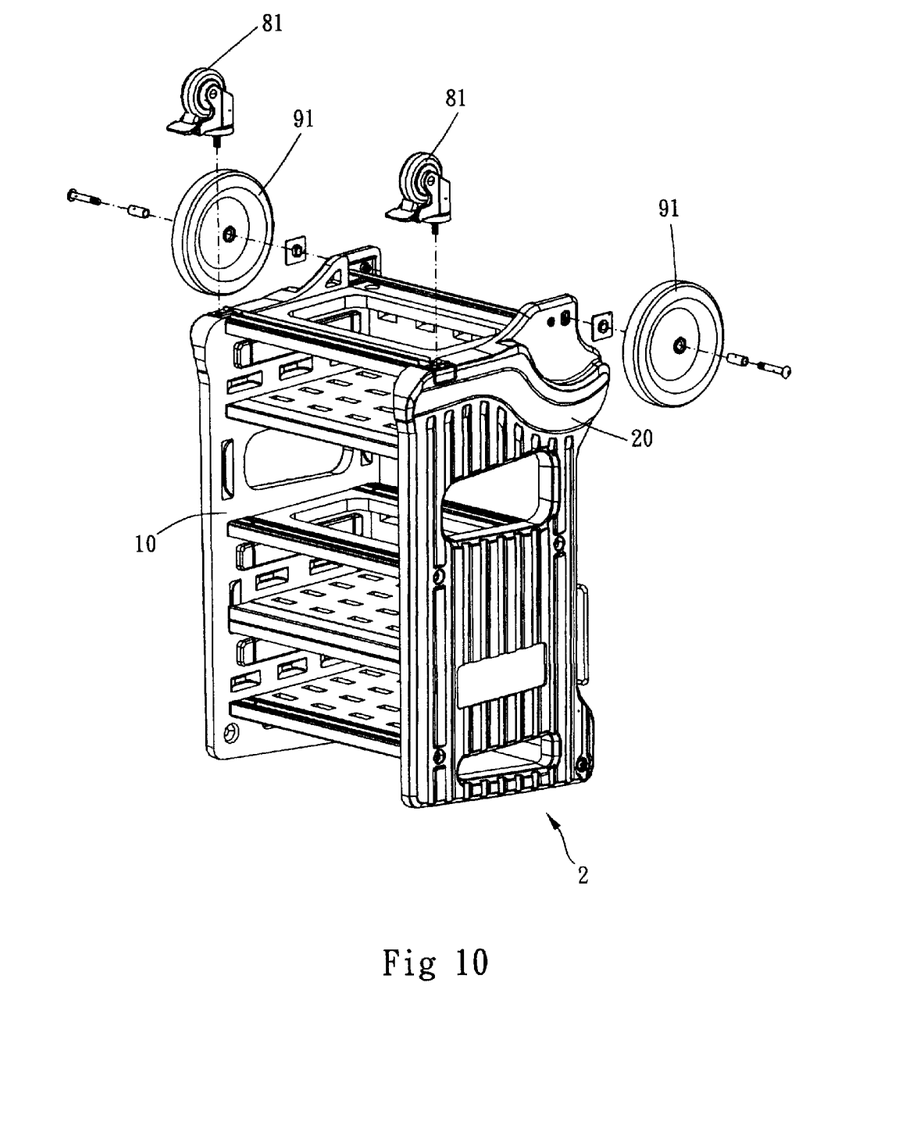
FIG. 10 is an exploded view to show the first and second wheel units and the body of the cart of the present invention.
Figure 11:
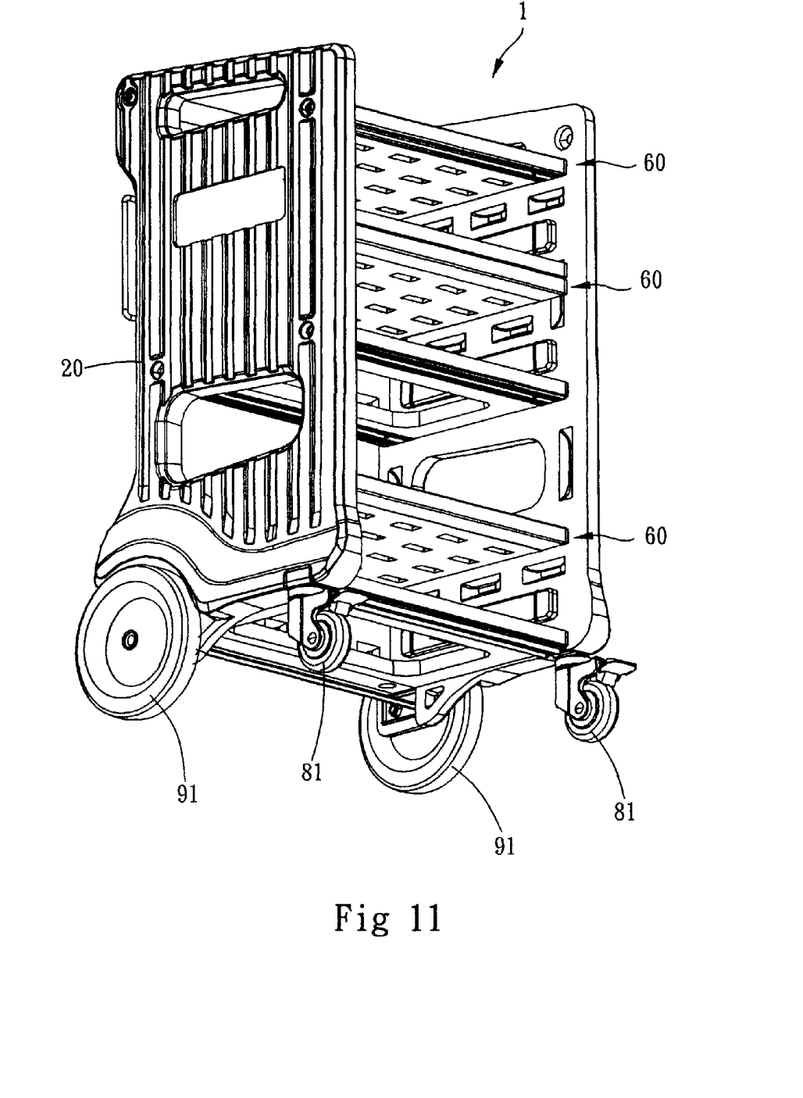
FIG. 11 shows the cart of the present invention.
Figure 12:
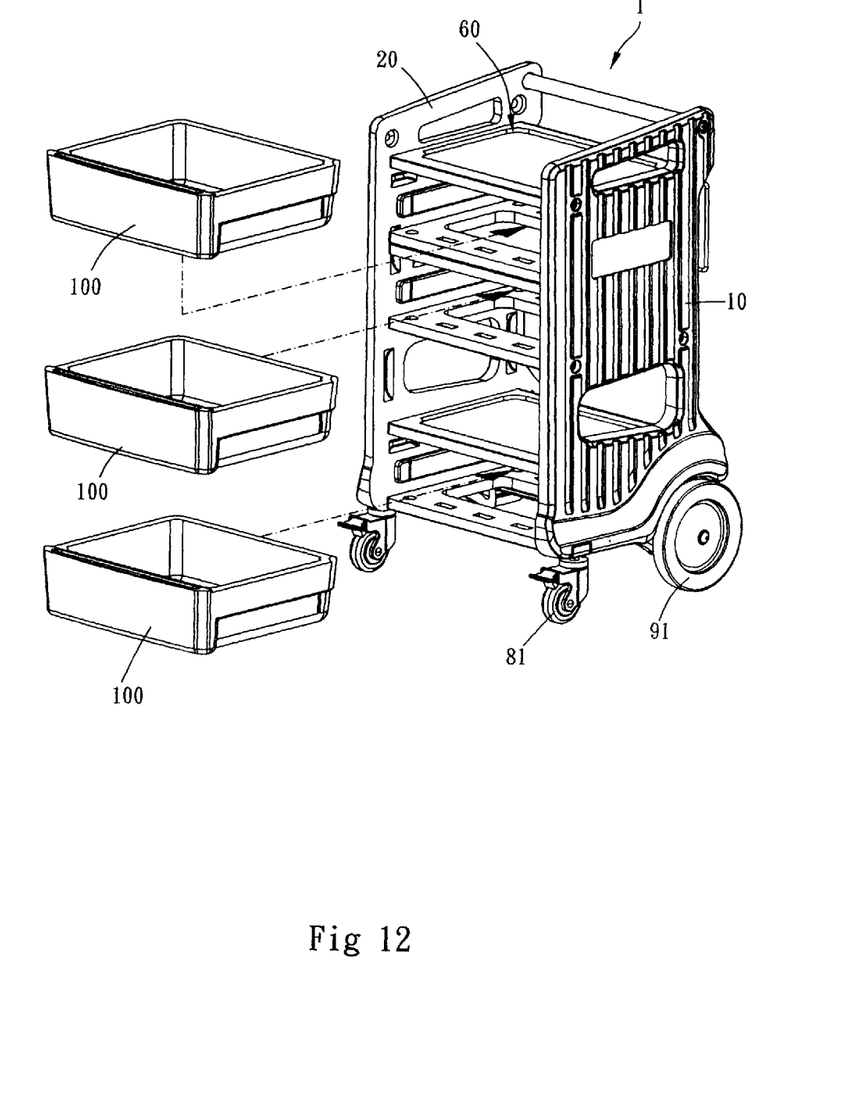
FIG. 12 shows boxes are to be installed to the cart of the present invention.
Figure 13:
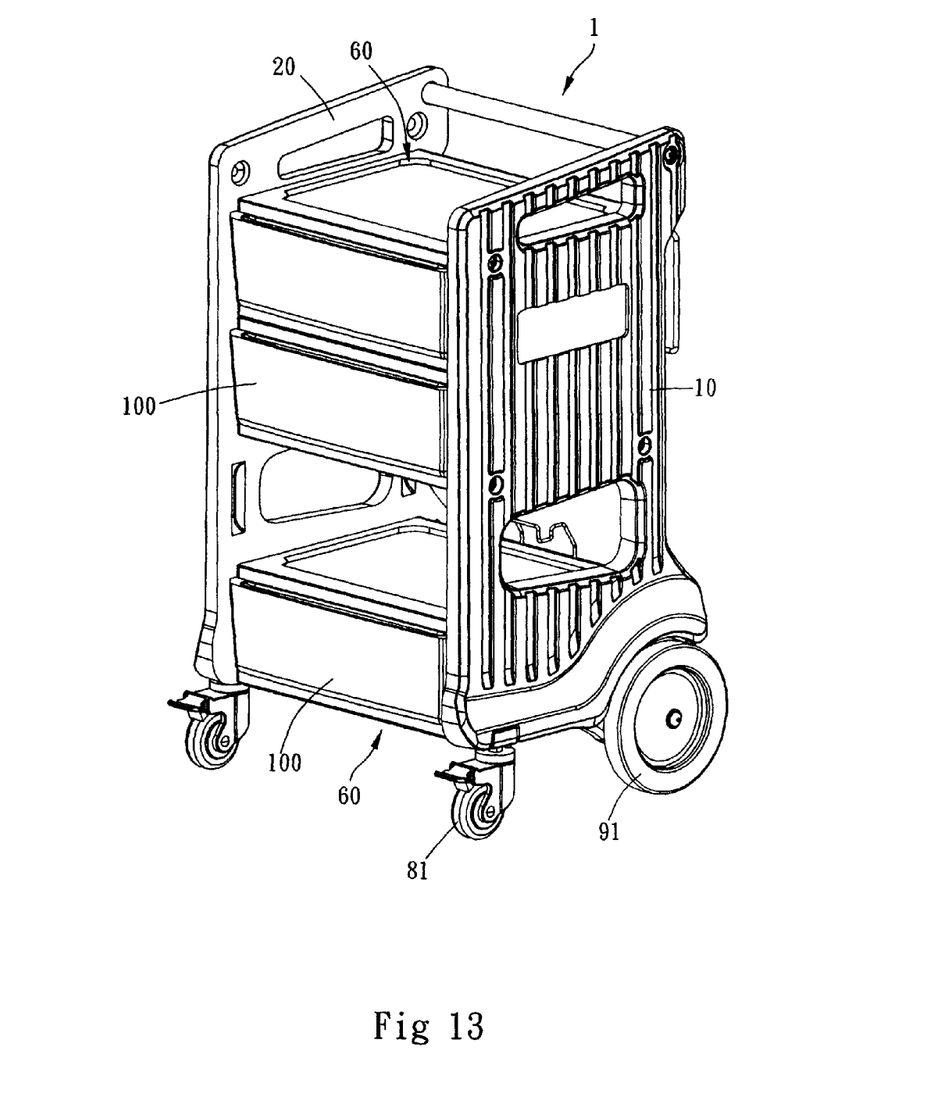
FIG. 13 shows that boxes are installed to the cart of the present invention.

Further referring to FIGS. 8-10, when assembling the cart 1, the first, second and third rod units are respectively connected to the first, second and third holes B, C, D between the first and second side boards 10, 20 by locking members "A" so as to assemble the body 2. The connectors 70 are used to be connected to the apertures 631, 632 of the two adjacent shelves 60. The first wheel unit is connected to the second holes C at the front side of the body 2 or the third rod unit by the locking members A. The second wheel unit is connected to the second holes C at the rear side of the body 2 or the third rod unit by the locking members A. The shelves 60 are put on the first, second and third rod units to form the cart 1. As shown in FIGS. 4 and 5, the two shelves 60 are put on the first and third rod units, and/or as shown in FIGS. 6 and 7, the shelf 60 is put on the second rod unit. As shown in FIGS. 12 and 13, the shelves 60 are used to receive tools and parts, preferably, a box 100 is inserted into the shelf 60 from the opening of the shelf 60, so that the user can pull and push the box 100 to pick tools or to put the tools back into the box 100.

The first and second side boards 10, 20 are made by way of plastic blow molding so that the cart 1 is light in weight. The shelves 60 are easily overlapped and connected by the connectors 70 to reinforce the structural strength. The diameters of the first and second wheel units are different, wherein the first wheel unit has the features of stopping the cart 1 and anti-slippery, and the second wheel unit having larger wheels can easily move over stepped area on the uneven surface.

While we have shown and described the embodiment in accordance with the present invention, it should be clear to those skilled in the art that further embodiments may be made without departing from the scope of the present invention.

What is claimed is:

1. A cart comprising:
    at least two side boards comprising a first side board and a second side board, the first and second side boards being elongate boards and made by way of plastic blow molding, each of the first and second side boards having first holes defined in an upper portion thereof, and second holes in a lower portion thereof, each of the first and second side boards having third holes which are located between the first and second holes, a third rod unit having two ends thereof extending through the third holes of the first and second side boards;
    at least two transverse rod units comprising a first rod unit and a second rod unit, two ends of the first rod unit extending through the first holes of the first and second side boards, two ends of the second rod unit extending through the second holes of the first and second side boards so as to assemble a body;
    at least two shelves movably mounted on the first and second rod units between the first and second side boards, each of the shelves including a top plate, a bottom plate and a connection plate which is perpendicularly connected to one side of each of the top and bottom plates, the connection plate of each of the shelves having at least two apertures, at least two connectors connected between the at least two apertures of two adjacent connection plates so as to connect two adjacent shelves to each other, and
    at least two wheel units comprising a first wheel unit and a second wheel unit, the first wheel unit connected to the second holes located at a front side of the body, the second wheel unit connected to the second holes located at a rear side of the body so as to assemble the cart.

2. The cart as claimed in claim 1, wherein the first wheel unit comprises two brake wheels, the second wheel unit comprises two climbing wheels, a diameter of each of the climbing wheels is larger than that of each of the brake wheels.

3. The cart as claimed in claim 1, wherein the first wheel unit comprises two brake wheels, the second wheel unit comprises two climbing wheels, a diameter of each of the climbing wheels is larger than that of each of the brake wheels.

* * * * *